United States Patent
Horigome et al.

(10) Patent No.: US 12,304,132 B2
(45) Date of Patent: May 20, 2025

(54) BLOW MOLDING DEVICE AND BLOW MOLDING METHOD FOR RESIN CONTAINER

(71) Applicant: NISSEI ASB MACHINE CO., LTD., Nagano (JP)

(72) Inventors: Hiroshi Horigome, Nagano (JP); Toshio Nakajima, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 330 days.

(21) Appl. No.: 17/761,450

(22) PCT Filed: Sep. 17, 2020

(86) PCT No.: PCT/JP2020/035319
§ 371 (c)(1),
(2) Date: Mar. 17, 2022

(87) PCT Pub. No.: WO2021/054403
PCT Pub. Date: Mar. 25, 2021

(65) Prior Publication Data
US 2022/0347912 A1    Nov. 3, 2022

(30) Foreign Application Priority Data

Sep. 20, 2019 (JP) .................. 2019-172269
Dec. 16, 2019 (JP) .................. 2019-226270

(51) Int. Cl.
B29C 49/64     (2006.01)
B29C 49/42     (2006.01)
B29C 49/78     (2006.01)

(52) U.S. Cl.
CPC .... *B29C 49/6427* (2013.01); *B29C 49/42855* (2022.05); *B29C 49/783* (2013.01);
(Continued)

(58) Field of Classification Search
CPC .......... B29C 49/42855; B29C 49/6427; B29C 49/783; B29C 49/062; B29C 2949/0715;
(Continued)

(56) References Cited

U.S. PATENT DOCUMENTS 10,751,927 B2    8/2020  Derrien
11,260,575 B2    3/2022  Kawamura et al.
(Continued)

FOREIGN PATENT DOCUMENTS

CN    110225811 A    9/2019
EP    2 207 664      4/2009
(Continued)

OTHER PUBLICATIONS

Office Action issued in corresponding Indian Patent Application No. 202217022751 dated Aug. 4, 2022, along with English translation thereof.
(Continued)

*Primary Examiner* — Monica A Huson
(74) *Attorney, Agent, or Firm* — GREENBLUM & BERNSTEIN, P.L.C.

(57) ABSTRACT

A blow molding apparatus includes: a temperature adjusting unit configured to supply a preform with cooling air to perform a temperature adjustment of the preform, the preform having been injection-molded, having a bottomed shape and made of a resin; a blow molding unit configured to blow-mold the preform that has been subjected to a temperature adjustment with blow air, and configured to manufacture a container made of a resin; an air tank configured to supply the temperature adjusting unit with the cooling air; and a recovery unit configured to recover the blow air exhausted from the blow molding unit into the air tank.

10 Claims, 5 Drawing Sheets

(52) U.S. Cl.
CPC ............... *B29C 2049/7835* (2022.05); *B29C 2049/7861* (2022.05)

(58) Field of Classification Search
CPC ...... B29C 2049/7861; B29C 2049/023; B29C 2049/7835; Y02P 70/10
See application file for complete search history.

(56) References Cited

U.S. PATENT DOCUMENTS

| | | | |
|---|---|---|---|
| 2008/0136068 | A1 | 6/2008 | Leone |
| 2009/0108505 | A1 | 4/2009 | Steiner |
| 2011/0057343 | A1* | 3/2011 | Brunner ............... B29C 49/783 425/522 |
| 2011/0089613 | A1 | 4/2011 | Hirdina |
| 2011/0298145 | A1 | 12/2011 | Lappe et al. |
| 2017/0203495 | A1 | 7/2017 | Derrien |

FOREIGN PATENT DOCUMENTS

| | | |
|---|---|---|
| JP | H 05237923 A | 9/1993 |
| JP | H 0985812 A | 3/1997 |
| JP | 3666124 B2 | 6/2005 |
| JP | 5725643 B2 | 5/2015 |
| JP | 2017-87651 A | 5/2017 |
| JP | 2017-524572 A | 8/2017 |
| JP | 6505344 B1 | 4/2019 |

OTHER PUBLICATIONS

Supplementary European Search Report issued Sep. 21, 2023 in European family member application No. 20866608.1.

Office Action issued Mar. 17, 2023 in Chinese family member application No. 202080077798.3. Note: This document is being submitted for its citation/characterization of the above documents as Category "Y", etc., and the Examiner's consideration is respectfully requested on that basis.

International Search Report and Written Opinion of the International Search Report issued in International Patent Application No. PCT/JP2020/035319, dated Nov. 24, 2020, along with an English translation thereof.

* cited by examiner

BLOW MOLDING DEVICE AND BLOW MOLDING METHOD FOR RESIN CONTAINER

BACKGROUND OF THE INVENTION

Field of the Invention

The present invention relates to a blow molding apparatus and a blow molding method for a resin container.

Description of the Related Art

A hot parison type blow molding apparatus has been conventionally known as one of apparatuses for manufacturing a resin container. The hot parison type blow molding apparatus is configured to blow-mold a resin container using residual heat generated in injection molding of a preform, and is advantageous in that it is possible to manufacture resin containers with varieties and excellence in aesthetic appearance as compared with a cold parison type.

For example, various proposals have been made for a hot parison type blow molding cycle for the purpose of shortening the molding cycle. In order to shorten these molding cycles, it has been proposed to shorten an injection molding time of the preform in a rate-determining stage (cooling time of the preform in an injection mold), and to additionally cool the preform having high heat in a downstream step after the injection molding (see, for example, JP 6505344 B1. In additionally cooling a preform having high heat in a downstream step after the injection molding, a method is also known in which the outer peripheral surface of the preform is brought into contact with a cooling mold for heat exchange, and compressed air is also made to flow into the preform to cool the preform.

Further, in the blow molding apparatus, a configuration has been proposed in which blow air used for shaping a resin container is recovered and reused as operation air of an actuator (see, for example, JP 5725643 B1 and JP 3666124 B1).

When the preform is additionally cooled by use of the compressed air in a downstream step after the injection molding, molding of containers with high quality is enabled in a short cycle, whereas the amount of the compressed air used in the blow molding apparatus increases accordingly. For this reason, an increase in the operation rate of the compressor for supplying the compressed air, an increase in the number of compressors, and the like may lead to a possibility that merits of reduction in the manufacturing cost due to the shortened molding cycle cannot be sufficiently obtained.

SUMMARY OF THE INVENTION

One aspect of the present invention includes: an injection molding unit configured to injection-mold a preform, the preform having a bottomed shape and made of a resin; a temperature adjusting unit configured to supply the preform with cooling air to perform a temperature adjustment of the preform; a blow molding unit configured to blow-mold the preform that has been subjected to the temperature adjustment with blow air, and configured to manufacture a container made of the resin; an air tank configured to supply the temperature adjusting unit with the cooling air; and a recovery unit configured to recover the blow air exhausted from the blow molding unit into the air tank.

Further features of the present invention will become apparent from the following description of exemplary embodiments with reference to the attached drawings.

DESCRIPTION OF THE EMBODIMENTS

Figure 1:
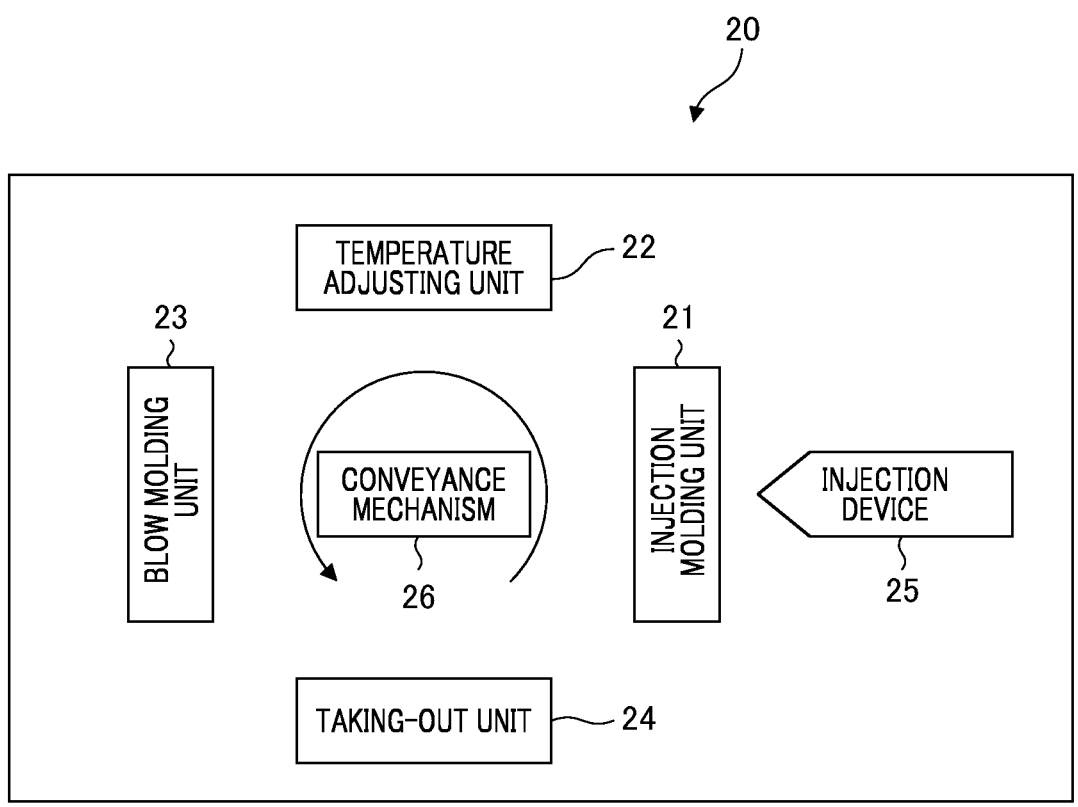
FIG. 1 is a diagram schematically illustrating a configuration of a blow molding apparatus in the present embodiment.

Hereinafter, embodiments of the present invention will be described with reference to the drawings.

In the embodiments, in order to facilitate understanding, structures and elements other than the main parts of the present invention will be described in a simplified or omitted manner. In addition, in the drawings, the same elements are denoted by the same reference numerals. Note that the shapes, dimensions, and the like of the respective elements illustrated in the drawings are schematically illustrated, and do not indicate actual shapes, dimensions, or the like.

FIG. 1 is a diagram schematically illustrating a configuration of a blow molding apparatus 20 in the present embodiment. The blow molding apparatus 20 in the present embodiment is a hot parison type (also referred to as a single-stage type) apparatus that blow-molds a container by utilizing residual heat (internal heat quantity) from injection molding without cooling a preform 11 to room temperature.

The blow molding apparatus 20 includes an injection molding unit 21, a temperature adjusting unit 22, a blow molding unit 23, a taking-out unit 24, and a conveyance mechanism 26. The injection molding unit 21, the temperature adjusting unit 22, the blow molding unit 23, and the taking-out unit 24 are respectively disposed at positions rotated by a predetermined angle (for example, 90 degrees) around the conveyance mechanism 26.

(Conveyance Mechanism 26)

The conveyance mechanism 26 includes a rotary plate (transfer plate, not illustrated) that rotates about an axis in a direction perpendicular to the sheet surface of FIG. 1. On the rotary plate, one or more neck molds, not illustrated, each for holding a neck portion of the preform or a resin container (hereinafter, simply referred to as a container) are arranged at every predetermined angle. The rotary plate may be a single disk-shaped member on which the neck mold is arranged at a corresponding position of each molding station, or may be configured to include a plurality of fan-shaped members (divided plates) divided for every molding station, so that a lip mold is arranged for every fan-shaped member. The conveyance mechanism 26 includes a rotating mechanism, an elevation mechanism (mold opening and closing mechanism), and a neck mold opening mechanism, which are not illustrated. The rotating mechanism of the conveyance mechanism 26 rotates the rotary plate to convey the preform (or the container) with the neck portion held by the neck mold to the injection molding unit 21, the temperature adjusting unit 22, the blow molding unit 23, and the taking-out unit 24 in this order. Note that the elevation mechanism of the conveyance mechanism 26 lifts up and down the rotary plate, and also performs operations related to mold closing and mold opening (mold releasing) for the preform in the injection molding unit 21.

(Injection Molding Unit 21)

The injection molding unit 21 includes an injection cavity mold and an injection core mold, each of which is not illustrated, and manufactures the preform. An injection device 25 that supplies a resin material, which is a raw material of the preform, is connected with the injection molding unit 21.

In the injection molding unit 21, the injection cavity mold, the injection core mold, and a neck mold 27 of the conveyance mechanism 26, which have been described above, are closed to form a preform-shaped mold space. Then, the resin material is poured into such a preform-shaped mold space from the injection device 25, and thus the preform is manufactured by the injection molding unit 21.

Here, the entire shape of the preform is a bottomed cylindrical shape in which one end side is opened and the other end side is closed. The neck portion is formed at an end of the preform on the opened side.

Further, the materials of the container and the preform include a thermoplastic synthetic resin, and can be appropriately selected according to the use of the container. Specific examples of the materials include PET (polyethylene terephthalate), PEN (polyethylene naphthalate), PCTA (polycyclohexanedimethylene terephthalate), TRITAN(Tritan (registered trademark)): copolyester manufactured by Eastman Chemical Co., Ltd.), PP (polypropylene), PE (polyethylene), PC (polycarbonate), PES (polyethersulfone), PPSU (polyphenylsulfone), PS (polystyrene), COP/COC (cyclic olefin-based polymer), PMMA (polymethyl methacrylate: acrylic), PLA (polylactic acid), and the like.

Note that even when the injection molding unit 21 is opened, the neck mold is not released by the neck mold opening mechanism of the conveyance mechanism 26, and the conveyance mechanism 26 holds and conveys the preform as it is. The number of the preforms simultaneously molded by the injection molding unit 21 (that is, the number of containers that can be simultaneously molded by the blow molding apparatus 20) can be appropriately set.

(Temperature Adjusting Unit 22)

The temperature adjusting unit 22 equalizes the temperatures or removes the uneven temperature in the preform that has been manufactured by the injection molding unit 21 to adjust the temperature of the preform to a temperature suitable for final blow (for example, about 90° C. to 105° C.). The temperature adjusting unit 22 also has a function of cooling the preform in a high temperature state after the injection molding.

The temperature adjusting unit 22 includes a cavity mold (not illustrated) capable of accommodating the preform, and a first air flow path and a second air flow path (neither of which is illustrated in FIG. 1) for introducing/exhausting compressed air into/from the preform.

The cavity mold of the temperature adjusting unit includes a temperature adjusting space having substantially the same shape as the preform that has been manufactured by the injection molding unit 21. In the cavity mold, the temperature of the temperature adjusting space is maintained at a predetermined temperature by heat exchange with a temperature adjusting medium.

The first air flow path of the temperature adjusting unit 22 is connected with, for example, an air introduction member inserted into the preform, and communicates with the bottom side of the preform. The second air flow path is configured to communicate with the space in the preform on the neck portion side of the preform, for example. The first air flow path and the second air flow path may have reverse configurations.

In the cooling blow (a process of continuously making the compressed air flow at normal temperature (20° C.) or lower into the preform and cooling the preform from the inner surface side by convection of the compressed air) of the temperature adjusting unit 22, the compressed air (cooling air) is introduced into the preform from the first air flow path, and the cooling air is exhausted from the second air flow path. In addition, the temperature adjusting unit 22 may perform a preliminary blow for bringing the preform into close contact with the inner wall of the cavity mold (a process of temporarily bulging the preform to a size smaller than the container before the blow molding), before or after performing the cooling blow.

(Blow Molding Unit 23)

The blow molding unit 23 blow-molds the preform, the temperature of which has been adjusted by the temperature adjusting unit 22, to manufacture a container.

The blow molding unit 23 includes blow cavity molds which are a pair of split molds corresponding to the shape of the container, a stretching rod, an air introduction member (none of which is illustrated), and an exhaust path (not illustrated in FIG. 1) for exhausting the blow air from the inside of the container. The blow molding unit 23 blow-molds the preform while stretching the preform. Accordingly, the preform is shaped into the blow cavity molds, and the container can be manufactured.

(Taking-Out Unit 24)

The taking-out unit 24 is configured to release the neck portion of the container that has been manufactured by the blow molding unit 23 from the neck mold, and to take out the container to the outside of the blow molding apparatus 20.

(Pneumatic Circuit of Blow Molding Apparatus)

Figure 2:
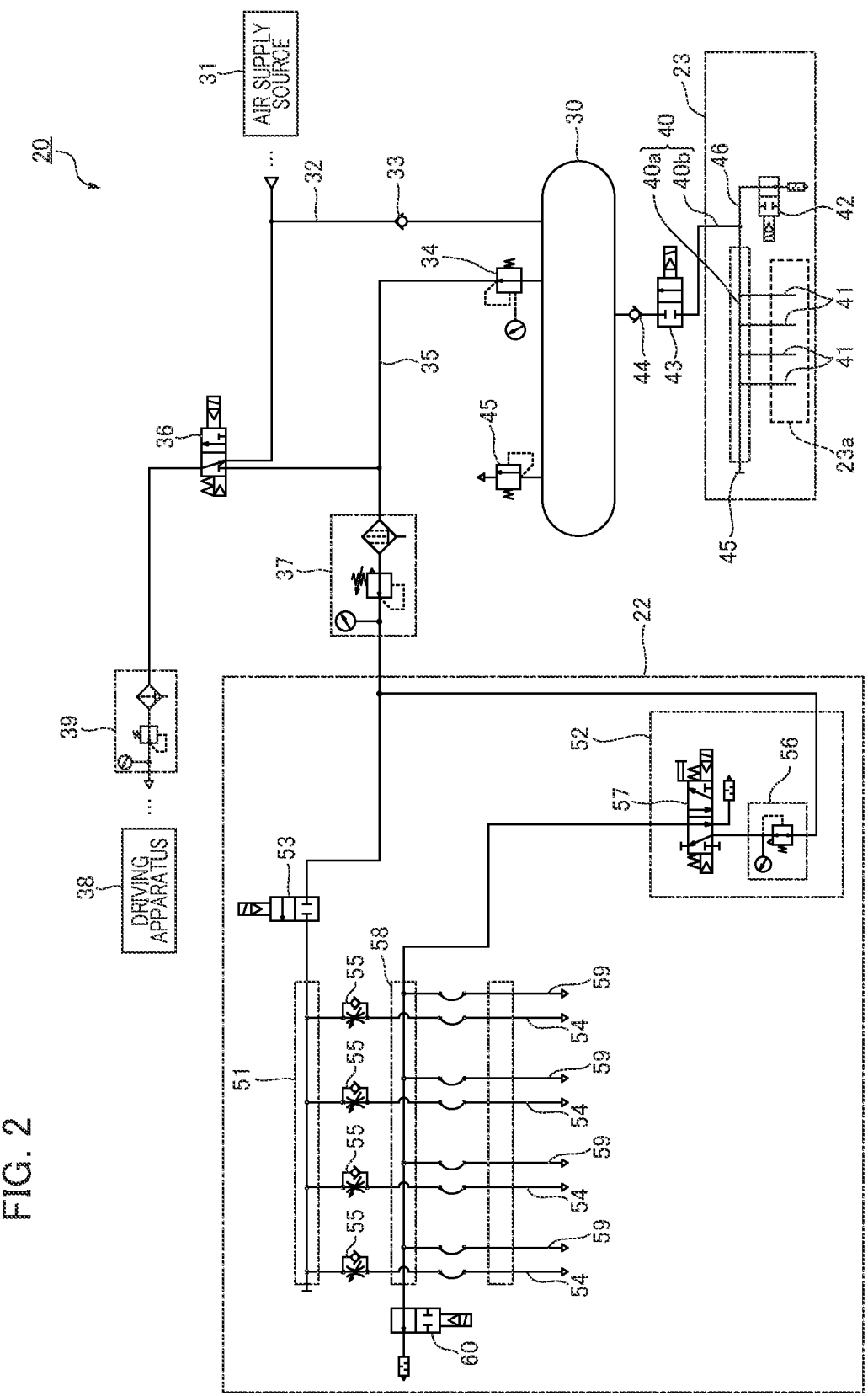
FIG. 2 is a diagram illustrating an example of a pneumatic circuit of the blow molding apparatus.

FIG. 2 is a diagram illustrating an example of a pneumatic circuit of the blow molding apparatus 20. In FIG. 2, illustration of parts (a high-pressure air supply source, and the like) for supplying the blow molding unit 23 with the blow air for shaping the container (air having a higher pressure than air of an air supply source 31 to be described later) is omitted for the sake of simplicity.

In the blow molding apparatus 20 in the present embodiment, the blow air supplied to the blow molding unit 23 and then exhausted from the container is partially recovered into an air tank 30, and the recovered air is reused as the compressed air supplied to the temperature adjusting unit 22. In addition, the recovered air that has been recovered in the air tank 30 is also supplied to various types of pneumatic driving apparatuses (hereinafter, each simply referred to as a driving apparatus) 38 that drive the blow molding apparatus 20, and is reused as operation air for the driving apparatus 38.

The blow molding apparatus 20 includes the air tank 30 for supplying the temperature adjusting unit 22 and the driving apparatus 38 with compressed air (cooling air, preliminary blowing air, and operation air). The air tank 30 is connected with the air supply source 31 (for example, an air compressor) through a first pipe 32 having a check valve 33, and receives low-pressure compressed air (low-pressure supply air) supplied from the air supply source 31. The first pipe 32 connected with the air supply source 31 branches partway, and is also connected with a switching valve (third direction control valve) 36 to be described later.

The air tank 30 is connected with a second pipe 35 including a first pressure reducing valve 34. The second pipe 35 branches into two pipes, one of the two pipes is connected with a switching valve 36 and the other is connected with the temperature adjusting unit 22 through a second pressure reducing valve 37. Note that the first pressure reducing valve 34 has a function of reducing the pressure of the compressed air flowing through the second pipe 35 to predetermined set pressure. The second pressure reducing valve 37 has a function of reducing the pressure of the cooling air flowing toward the temperature adjusting unit 22 to predetermined set pressure.

Here, the switching valve 36 is a direction control valve with the first pipe 32 (a flow from the air supply source 31) and the second pipe 35 (a flow from the air tank 30) as inputs and various types of driving apparatuses 38 as outputs. The switching valve 36 is capable of supplying, through valve switching control, the driving apparatuses 38 with the compressed air of either the recovered air of the air tank 30 or the low-pressure supply air from the air supply source 31, as the operation air. In addition, a third pressure reducing valve 39 that reduces the pressure, in a case where the operation air supplied to the driving apparatuses 38 is not reduced to the set pressure, is provided between the switching valve 36 and the driving apparatuses 38.

Further, a recovery pipe 40 for recovering the blow air exhausted from the container of the blow molding unit 23 is connected with the air tank 30. Note that the pressure (for example, 2.0 MPa to 3.5 MPa) of the blow air for shaping the container is higher than the pressure (for example, 0.3 MPa to 0.8 MPa) of the cooling air of the temperature adjusting unit 22 and the air supply source 31 (for example, 1.2 MPa to 1.5 MPa). The recovery pipe 40 includes a first recovery pipe 40a and a second recovery pipe 40b. The first recovery pipe 40a is connected with a supply path 45 through which the blow air supplied from a high-pressure air supply source, not illustrated, is made to flow. Further, the first recovery pipe 40a is connected with a plurality of (four in FIG. 2) supply and exhaust paths 41 each arranged for every blow cavity mold 23a of the blow molding unit 23. The supply and exhaust path 41 has a function as an air supply path through which the blow air flows to the blow cavity mold 23a side, and also has a function as an air exhaust path through which the blow air of the container flows to the first recovery pipe 40a. The first recovery pipe 40a has a function as an air supply path through which the blow air from the supply path 45 flows to the blow cavity mold 23 side, and also has a function as a recovery path through which the blow air exhausted from the container flows to the air tank 30 side. The second recovery pipe 40b is connected with the air tank 30. Accordingly, the recovery pipe 40 is capable of receiving the blow air exhausted from each container when the container is shaped, and recovering the blow air in the air tank 30.

The pipeline of the recovery pipe 40 in the blow molding unit 23 branches partway, and one pipeline (first recovery pipe 40a) is connected with an exhaust path 46 and an exhaust valve (fourth direction control valve) 42 for releasing the blow air to the atmosphere. In addition, the other pipeline (second recovery pipe 40b) that is branched of the recovery pipe 40 is connected with the air tank 30. The other pipeline is provided with a recovery valve (fifth direction control valve) 43 for switching between supply and stop the supply of the blow air exhausted from the container to the air tank 30, and a check valve 44 for preventing a backflow from the air tank 30 in this order, as viewed from the blow molding unit. The recovery pipe 40 and the recovery valve 43 constitutes an example of a recovery unit.

Note that the air tank 30 is also provided with a relief valve 45 that opens when the pressure in the air tank 30 exceeds a predetermined upper limit value to release the pressure to the outside.

On the other hand, the pneumatic circuit of the temperature adjusting unit 22 is configured as follows. The second pipe 35 is branched into two pipes in the temperature adjusting unit 22, and the two pipes are respectively connected with a cooling air supplying unit 51 and a preliminary blow control unit 52 of the temperature adjusting unit 22.

The cooling air supplying unit 51 includes a first direction control valve 53 that switches between supply and stop of the cooling air. The cooling air supplying unit 51 is connected with each of the plurality of first air flow paths 54 each arranged for every cavity mold of the temperature adjusting unit 22. Each of the first air flow path 54 includes a speed controller (flow rate control valve) 55, and is capable of introducing the cooling air into the preform by changing the flow rate appropriately.

The preliminary blow control unit 52 includes a fourth pressure reducing valve 56 that reduces the pressure of the compressed air to set pressure of the preliminary blow, and a second direction control valve 57 that switches between supply and stop of the preliminary blowing air (compressed air). The preliminary blow control unit 52 is connected with a cooling air exhausting unit (preliminary blowing air supplying unit) 58 of the temperature adjusting unit 22. The cooling air exhausting unit 58 is connected with each of the plurality of second air flow paths 59 arranged for every cavity mold of the temperature adjusting unit 22. In addition, the cooling air exhausting unit 58 is connected with an exhaust valve (sixth direction control valve) 60 for releasing the cooling air to the atmosphere.

Here, when the temperature adjusting unit 22 performs the cooling blow, the second direction control valve 57 of the preliminary blow control unit 52 is in a closed state. At this time, the second pipe 35 and the cooling air exhausting unit 58 are disconnected, whereas the cooling air exhausting unit 58 communicates with the exhaust port of the second direction control valve 57. Then, both the first direction control valve 53 of the cooling air supplying unit 51 and the exhaust valve 60 of the cooling air exhausting unit 58 are in an open state.

Accordingly, the cooling air that has passed through the cooling air supplying unit 51 is introduced into the preform through the first air flow path 54. Then, the cooling air flows through the second air flow path 59 to the cooling air exhausting unit 58, and is released to the atmosphere. Furthermore, the cooling air flows through the second direction control valve 57 to the atmosphere. As a result, the back pressure of the cooling air introduced into the preform can be suppressed, and the cooling efficiency of the preform can be enhanced.

On the other hand, when the temperature adjusting unit 22 performs the preliminary blow, both the first direction control valve 53 of the cooling air supplying unit 51 and the exhaust valve 60 of the cooling air exhausting unit 58 are in a closed state. Then, the second direction control valve 57 of the preliminary blow control unit 52 is in an open state (the second pipe 35 and the cooling air exhausting unit 58 are communicated with each other). Accordingly, the preliminary blowing air that has passed through the preliminary blow control unit 52 is introduced through the second air flow path 59 into the preform from the cooling air exhausting unit 58, so that the preliminary blow can be performed. Heretofore, the description with reference to FIG. 2 ends.

(Description of Blow Molding Method)

Next, a blow molding method by the blow molding apparatus 20 in the present embodiment will be described.

Figure 3:
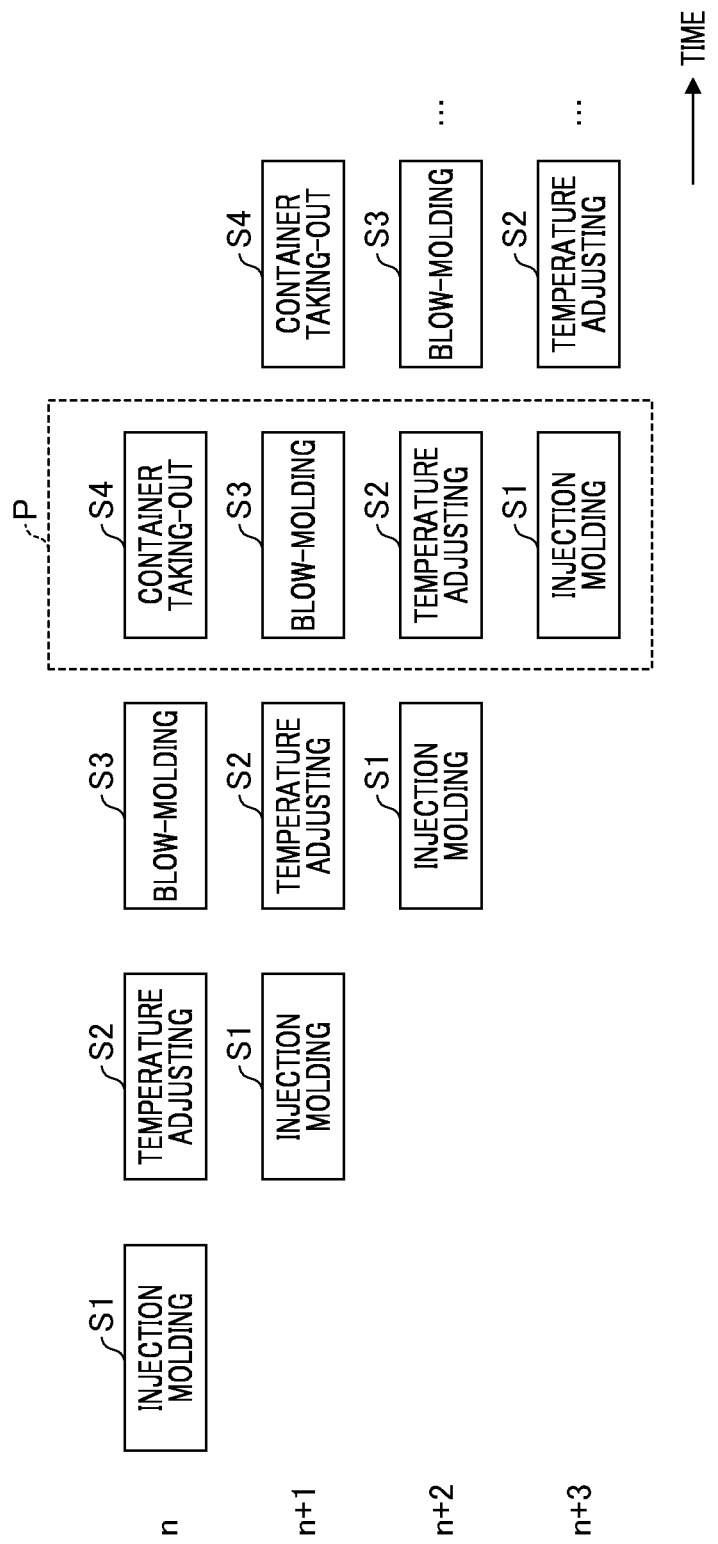
FIG. 3 is a flowchart illustrating steps of a blow molding method.

FIG. 3 is a diagram illustrating steps of the blow molding method, and the horizontal axis of FIG. 3 represents time. In the blow molding method in the present embodiment, an injection molding step, a temperature adjusting step, a blow molding step, and a container taking-out step are sequentially performed as container manufacturing steps. Hereinafter, an outline of each step will be described.

(Step S1: Injection Molding Step)

First, in the injection molding unit 21, a resin is injected from the injection device 25 into a preform-shaped mold space formed with the injection cavity mold, the injection core mold, and the neck mold of the conveyance mechanism 26, and the preform is manufactured.

In step S1, the injection molding unit 21 is opened immediately after an end of the resin filling or after the minimum cooling time provided after the resin filling. That is, the preform in a high temperature state in which the outer shape of the preform can be maintained is released from the injection cavity mold and the injection core mold. Then, the rotary plate of the conveyance mechanism 26 rotates by a predetermined angle, and the preform held by the neck mold is conveyed to the temperature adjusting unit 22.

(Step S2: Temperature Adjusting Step)

Subsequently, the temperature adjusting unit 22 makes a temperature adjustment for bringing the temperature of the preform close to a temperature suitable for the final blow.

In the temperature adjusting step, after the preform is accommodated in a temperature adjusting space of the cavity mold, the air introduction member is inserted into the neck portion of the preform, and the internal space of the preform is connected with the first air flow path 54 and the second air flow path 59. Then, the preliminary blow is performed before and after the cooling blow as necessary.

In the preliminary blow, for example, the compressed air (preliminary blowing air: recovered air in the air tank 30) is fed from the second air flow path 59 into the preform. Accordingly, the preform can be brought into close contact with the inner wall of the cavity mold before the cooling blow. Note that the preliminary blow may be omitted.

In the cooling blow, the compressed air (cooling air: recovered air in the air tank 30) is introduced into the preform from the first air flow path 54, and the cooling air is exhausted from the second air flow path 59. By this cooling blow, the preform is cooled from the inside by convection of the cooling air flowing in the inside. At this time, the preform is continuously in contact with the cavity mold. Therefore, the temperature of the preform is adjusted from the outside so that the temperature does not become equal to or lower than a temperature suitable for the blow molding, and the uneven temperature that has occurred in the injection molding is also reduced. Note that the temperature adjusting space of the cavity mold has substantially the same shape as that of the preform. Thus, the shape of the preform does not change largely in the temperature adjusting unit 22.

After the temperature adjusting step, the rotary plate of the conveyance mechanism 26 rotates by a predetermined angle, and the preform that has been subjected to the temperature adjustment and that is held in the neck mold is conveyed to the blow molding unit 23.

(Step S3: Blow Molding Step)

Subsequently, the container is blow-molded in the blow molding unit 23.

First, the blow cavity mold is closed, the preform is accommodated in the mold space, and the air introduction member is inserted into the neck portion of the preform. Then, the stretching rod and the air introduction member are moved down, the preform is stretched by the stretching rod, and the blow air is introduced into the preform from the air introduction member. Accordingly, the preform is bulged and shaped so as to be in close contact with the mold space of the blow cavity mold, and is blow-molded into the container.

(Step S4: Container Taking-Out Step)

The blow molding ends, and then the blow cavity mold is opened. Accordingly, the container becomes movable from the blow molding unit 23.

Subsequently, the rotary plate of the conveyance mechanism 26 rotates by a predetermined angle, and the container is conveyed to the taking-out unit 24. In the taking-out unit 24, the neck portion of the container is released from the neck mold, and the container is taken out to the outside of the blow molding apparatus 20.

Heretofore, one cycle of the blow molding method ends. Then, the rotary plate of the conveyance mechanism 26 is rotated by a predetermined angle, so that the respective steps of S1 to S4 that have been described above are repeated.

In addition, while the blow molding apparatus 20 is operating, four sets of container manufacturing steps each having a time difference by one step are performed in parallel. For example, in the blow molding apparatus 20, in a period P surrounded by a broken line in FIG. 3, an n-th set of the container taking-out step (S4), an (n+1)-th set of the blow molding step (S3), an (n+2)-th set of the temperature adjusting step (S2), and an (n+3)-th set of the injection molding step (S1) are respectively performed (where n is any integer).

Figure 4:
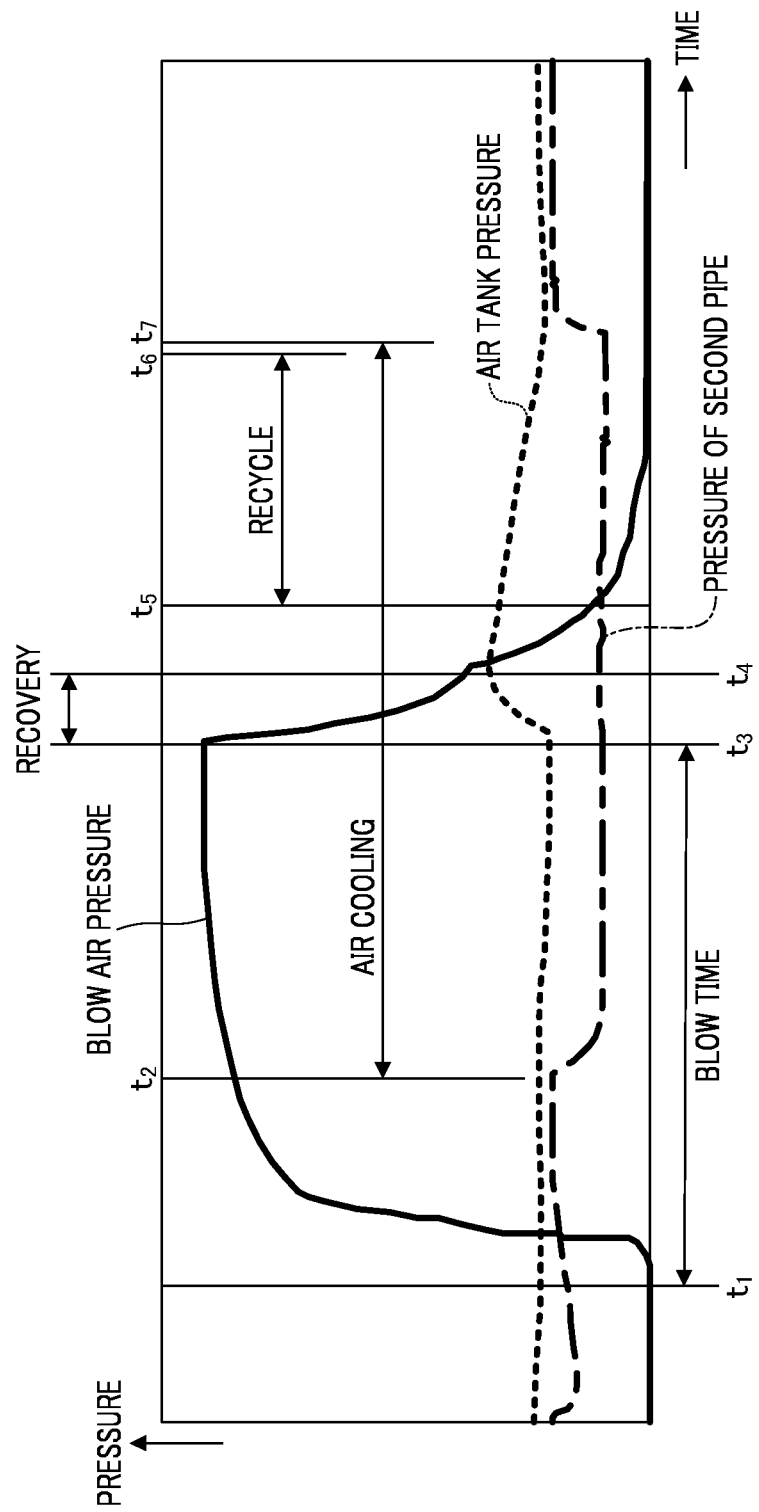
FIG. 4 is a graph illustrating a pressure change of compressed air related to operations of a blow molding unit and a temperature adjusting unit in a period P in FIG. 3.

FIG. 4 is a graph illustrating a pressure change of the compressed air related to operations of the blow molding unit 23 and the temperature adjusting unit 22 in the period P of FIG. 3. The vertical axis in FIG. 4 represents pressure, and the horizontal axis in FIG. 4 represents time. In addition, the pressure of the blow air in the container is indicated by a solid line in FIG. 4, the pressure of the air tank is indicated by a broken line in FIG. 4, and the pressure of the second pipe 35 through which the compressed air flows toward the temperature adjusting unit 22 is indicated by a one-dot chain line in FIG. 4.

In FIG. 4, a period from time $t_1$ to time $t_3$ indicates the blow time while the blow molding is being performed, and a period from time $t_2$ to time $t_7$ indicates the time for air cooling of the preform in the temperature adjusting unit 22. That is, in the period P, the blow molding of the blow molding unit 23 is performed first, and the cooling blow of the temperature adjusting unit 22 is continuously performed even after the blow molding ends. In addition, the blow molding is performed from time $t_1$ to time $t_3$, the pressure of the blow air increases. During the period from time $t_2$ to time $t_7$, the cooling air is continuously flowing to the outside by the cooling blow of the temperature adjusting unit 22. Thus, the pressure of the second pipe 35 decreases. Note that in a case where there is a time zone (time $t_1$ to time $t_3$) while the cooling blow and the blow molding are performed in parallel, the cooling blow may be performed first. Further, the preliminary blow may be performed before and after the cooling blow. In FIG. 4, the preliminary blow is performed for a short period immediately after time $t_2$.

When time $t_3$ elapses, the blow molding ends. Subsequently, during a period from time $t_3$ to time $t_4$, the recovery valve 43 is opened and in addition the exhaust valve 42 is closed, the blow air is recovered from the recovery pipe 40 into the air tank 30, and the recovered air is accumulated in the air tank 30. Therefore, the pressure of the blow air decreases. In addition, during a period from time $t_3$ to time $t_4$ in FIG. 4, the pressure of the air tank 30 is increased by the blow air to be recovered.

Here, the pressure of the blow air is larger than the pressure of the air supply source 31. Therefore, even during a short recovering period (time $t_3$ to time $t_4$) for recovering the blow air, the pressure of the air tank 30 largely increases as compared with a case where the blow air is not recovered.

Further, the blow air is recovered during an air cooling period while the cooling air is being released in the temperature adjusting unit 22. In the air tank 30, the air release and air recovery are simultaneously conducted. Therefore, the period while differential pressure exists between the blow air and the air tank 30 (period while the blow air can be recovered) extends, as compared with a case where the air is recovered without the air release, and the recovered amount of the blow air can be further increased.

After time $t_4$, during a period from time $t_5$ to time $t_6$, the switching valve 36 is switched to supply the driving apparatus 38 with the compressed air from the air tank 30 (operation air: the recovered air in the air tank 30) (a recycle operation of the driving apparatus 38). Further, during at least a period from time $t_2$ to time $t_4$ in the next molding cycle, the first direction control valve 53 is switched to supply the temperature adjusting unit 22 with the compressed air from the air tank 30 (cooling air or preliminary blowing air: the recovered air in the air tank 30) (a recycle operation of the temperature adjusting unit 22).

As described heretofore, in the present embodiment, the blow air supplied to the blow molding unit 23 and then exhausted from the container is partially recovered into the air tank 30, and is reused as the compressed air supplied to the temperature adjusting unit 22. For example, as compared with a case where the cooling air in the temperature adjusting step is entirely supplied from the air supply source 31, the amount of the compressed air supplied from the air supply source 31 is reduced in the present embodiment. Thus, the operation cost of the blow molding apparatus 20 can be suppressed.

In addition, in the present embodiment, the blow air that has been recovered in the air tank 30 is also reused as the operation air of the driving apparatus 38. Also in this respect, the amount of the operation air supplied from the air supply source 31 to the driving apparatus 38 is reduced. Thus, the operation cost of the blow molding apparatus 20 can be suppressed.

Further, in the present embodiment, the temperature adjustment and cooling of the preform can be conducted in the temperature adjusting step (S2). Thus, the preform can be released from the mold even in a high temperature state in the injection molding step (S1), and molding of the next preform can be started early. That is, according to the present embodiment, the container can be molded desirably, while the molding cycle time is shortened.

The present invention is not limited to the above embodiments, and various improvements and design changes may be made without departing from the gist of the present invention.

For example, in a case where the consumed amounts of the air in the temperature adjusting unit 22 (the cooling blow and the preliminary blow) and the driving apparatus 38 are larger than the amount of the recovered air, an insufficient amount of the compressed air may be supplemented from the air supply source 31. For example, when the pressure of the air tank 30 becomes lower than a specified value due to the consumption of the recovered air, the compressed air (low-pressure supply air) from the air supply source 31 may be automatically supplied to the air tank 30 or the driving apparatus 38.

Figure 5:
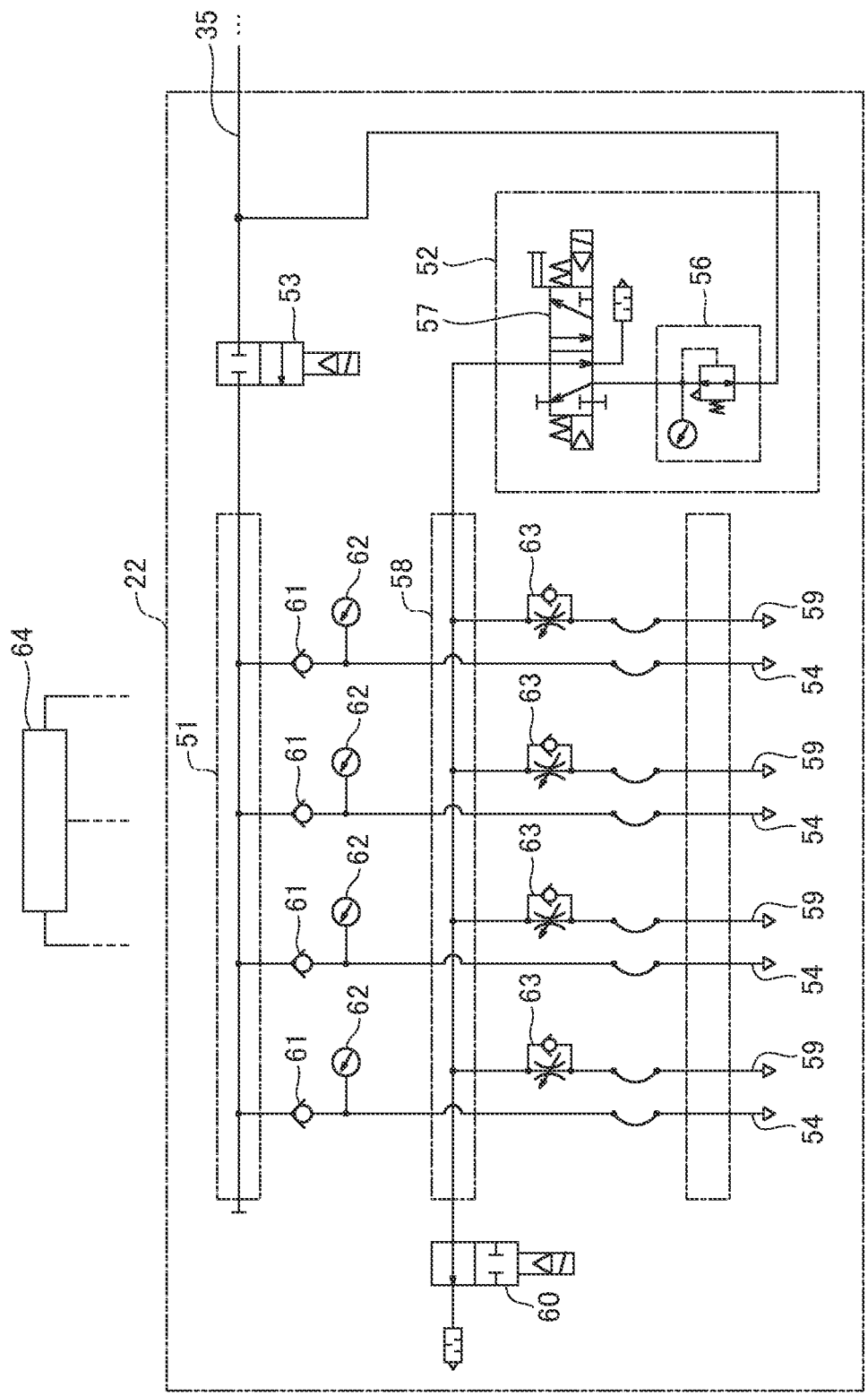
FIG. 5 is a diagram illustrating a pneumatic circuit of the temperature adjusting unit in a modification.

Further, the configuration of the temperature adjusting unit 22 is not limited to the example of FIG. 2, and may be, for example, a configuration illustrated in FIG. 5. FIG. 5 is a diagram illustrating a pneumatic circuit in a modification of the temperature adjusting unit 22 in the above-described embodiments. Note that, in the description of FIG. 5, the same elements as those in FIG. 2 are denoted by the same reference numerals, and overlapping descriptions will be omitted.

The second pipe 35 is similarly branched into two pipes in the temperature adjusting unit 22 as illustrated in FIG. 5, and the two pipes are respectively connected with the cooling air supplying unit 51 and the preliminary blow control unit 52 of the temperature adjusting unit 22. In addition, the first air flow path 54 and the second air flow path 59 to be described later are connected with an air introduction member, not illustrated. In the molding, the air introduction member is connected with the preform in an airtight state. Hence, the first air flow path 54 and the second air flow path 59 substantially communicate with each other.

The cooling air supplying unit 51 includes a first direction control valve 53 that switches between supply and stop of the cooling air. The cooling air supplying unit 51 is connected with each of the plurality of first air flow paths 54 each arranged for every cavity mold of the temperature adjusting unit 22. Each of the first air flow paths 54 constitutes a part of an air flow path for the preform temperature adjustment, serves as a flow path for introducing the cooling air (compressed air) into the preform, and includes a check valve 61 and a pressure gauge 62.

The check valve 61 is a valve for preventing a backflow of the cooling air from each of the first air flow paths 54 to the cooling air supplying unit 51. The pressure gauge 62 is an example of a measuring unit, is provided on a downstream side of the check valve 61 in the first air flow path 54, and measures the pressure of the cooling air in each of the first air flow paths 54 branched from the cooling air supplying unit 51.

On the other hand, the preliminary blow control unit 52 includes the fourth pressure reducing valve 56 that reduces the pressure of the compressed air to the set pressure of the preliminary blow, and the second direction control valve 57 that switches between supply and stop of the preliminary blowing air (compressed air). The preliminary blow control unit 52 is connected with a cooling air exhausting unit (preliminary blowing air supplying unit) 58 of the temperature adjusting unit 22. The cooling air exhausting unit 58 is connected with each of the plurality of second air flow paths 59 arranged for every cavity mold of the temperature adjusting unit 22. In addition, the cooling air exhausting unit 58 is connected with an exhaust valve (sixth direction control valve) 60 for releasing the cooling air to the atmosphere.

Each of the second air flow paths 59 constitutes a part of the air flow path for the temperature adjustment, and has a function of exhausting the cooling air that flows out of the preform at the time of cooling blow, and introducing the preliminary blowing air that has passed through the preliminary blow control unit 52 into the preform at the time of preliminary blow. Furthermore, each of the second air flow paths 59 has a function of controlling a flow rate of the cooling air supplied to and discharged from (introduced into and exhausted from) the preform. Each of the second air flow paths 59 includes a speed controller (flow rate control valve) 63, which is an example of an adjusting unit that adjusts the flow rate of the cooling air. At the time of cooling blow, the speed controller 63 appropriately changes the flow rate of the cooling air flowing through the second air flow path 59, so that the flow rate of the cooling air flowing through the first air flow path 54 communicating with the air introduction member via the preform is also changed to a similar value. Accordingly, the flow rate of the cooling air introduced (supplied) into the preform can be adjusted. In the air flow path for the temperature adjustment, the speed controller 63 is arranged in a meter-out manner on a downstream side of the preform into which the cooling air is introduced, so that the cooling air with a stable flow rate (flow velocity) and pressure can be introduced into the preform.

In addition, the pressure gauges 62 and the speed controllers 63 are each connected with a control device 64 such as a programmable logic controller (PLC). The control device 64 is an example of a control unit, and receives the pressure value of the cooling air that has been measured by each pressure gauge 62. Then, the control device 64 controls the opening degree of each speed controller 63, based on the pressure value for every flow path.

For example, the control device 64 may control the opening degree of each speed controller 63 so that a difference in the flow rate of the cooling air between the plurality of branched flow paths falls within an allowable value. Accordingly, the control device 64 is capable of suppressing a variation in the flow rate of the cooling air between the plurality of branched flow paths.

In addition, in a case where the variation in the temperature of the preforms are large at the time of test operation, the control device 64 may change the opening degree of specific speed controller(s) 63 based on an operator's input so as to adjust the cooling strength between the preforms. Accordingly, the temperature of each preform can be made closer to a constant temperature.

Note that in the configuration of FIG. 5, open and closed states of the valves in the case of performing the cooling blow and the case of performing the preliminary blow are similar to those in the description with reference to FIG. 2.

Hereinafter, operations according to the configuration of FIG. 5 will be briefly described. In the blow molding apparatus, it is important to equalize the temperatures of the preforms in order to simultaneously mold a large number of containers each having the same quality. However, the temperatures of the preforms immediately after the injection molding are often uneven. Therefore, in the temperature adjusting unit 22, it is necessary to appropriately and precisely adjust the flow rate of the cooling air for each preform.

In the temperature adjusting unit 22, the flow path for supplying air to each preform is branched from the cooling air supplying unit 51 connected with the air tank 30. However, the flow path length and the pipe resistance after having been branched are slightly different. For this reason, the cooling air tends to flow in a concentrated manner in a flow path having smaller resistance between the branched flow paths. Accordingly, a difference in pressure occurs between the branched flow paths, and the flow rate of the cooling air flowing through each preform varies. As a result, there is a possibility that the cooling strength is different in every preform.

By the way, for example, in a case where an operator manually adjusts the flow rate of the cooling air for every flow path using the speed controller, the following phenomena occur. The flow rate of the cooling air for every flow path can be roughly grasped by the operator from the rotation number of the knob of the speed controller. However, when the pressure of the cooling air in the branched flow path varies, the actual flow rate of the cooling air has a large deviation from a theoretical value. Thus, it is difficult to accurately grasp the accurate flow rate.

In addition, in the test operation, a thermographic image of each preform after cooling is compared with a thickness distribution of the container that has been subjected to the blow molding, so that the operator can manually adjust the opening degree of the speed controller finely for every flow path. However, the above adjustment is a large load for the operator, and such an operation includes many qualitative determinations. Hence, individual differences may occur depending on the operator.

In contrast to this, the control device 64 of FIG. 5 controls the opening degree of the speed controller 63 for every flow path, based on a measurement value of the pressure of the cooling air for every flow path. Therefore, according to the configuration of FIG. 5, the flow rate of the cooling air for each preform can be precisely adjusted, based on the quantitative index of the pressure value of the pressure gauge 62, so that the temperature of each preform can be adjusted in the temperature adjusting unit 22 with high accuracy.

Here, the arrangement of the pressure gauge 62 and the speed controller 63 in FIG. 5 is merely an example. For example, the pressure gauge 62 may be provided in the second air flow path 59.

Note that also in the example of FIG. 5, the operator may visually check the pressure value of the pressure gauge 62, and may adjust the opening degree of the speed controller 63 for every flow path.

In addition, the embodiments disclosed herein are to be considered in all respects as illustrative and non-limiting ones. The scope of the present invention is indicated not by the above description but by the scope of claims, and it is intended that meanings equivalent to the claims and all modifications within the scope are included.

The invention claimed is:

1. A blow molding apparatus comprising:
    a temperature adjusting unit having a first mold that accommodates a preform and configured to perform a cooling blow that supplies cooling air to the preform in the first mold in order to adjust a temperature of the preform, the preform having been injection-molded, having a bottomed shape and made of a resin;
    a blow molding unit having a second mold different from the first mold and that accommodates the preform, configured to blow-mold the preform that has been subjected to a temperature adjustment with blow air in the second mold, and configured to manufacture a container made of a resin;
    an air tank configured to supply the temperature adjusting unit with the cooling air; and
    a recovery unit configured to recover the blow air exhausted from the blow molding unit into the air tank.

2. The blow molding apparatus according to claim 1, wherein
    the recovery unit recovers the blow air into the air tank through a recovery pipe, while the cooling air is being supplied from the air tank to the temperature adjusting unit.

3. The blow molding apparatus according to claim 2, wherein
the blow air is recovered after the blow-molding ends.

4. The blow molding apparatus according to claim 2, wherein
the blow molding apparatus blow-molds the preform in a first set of a container manufacturing step and performs the temperature adjustment of the preform in a second set of a container manufacturing step in parallel, and
while the cooling air is being supplied from the air tank to the temperature adjusting unit during the second set of container manufacturing step, the recovery unit recovers the blow air into the air tank, the blow air being exhausted from the blow molding unit during the first set of container manufacturing step.

5. The blow molding apparatus according to claim 1, wherein
pressure of the cooling air is lower than pressure of the blow air.

6. The blow molding apparatus according to claim 1, further comprising
an operation air supplying unit configured to supply a pneumatic driving apparatus included in the blow molding apparatus with operation air from the air tank, the operation air including the blow air that has been recovered.

7. The blow molding apparatus according to claim 1, wherein
the temperature adjusting unit introduces air including the blow air that has been recovered into the preform from a flow path different from a flow path for introducing the cooling air into the preform, and conducts preliminary blow.

8. The blow molding apparatus according to claim 1, wherein
the temperature adjusting unit includes a plurality of air flow paths for the temperature adjustment in parallel for introducing the cooling air into the preform and exhausting the cooling air from the preform, and is capable of performing the temperature adjustment of a plurality of the preforms, and
each of the air flow paths for the temperature adjustment includes:
a measuring unit configured to measure pressure of the cooling air in each of the flow paths for temperature adjustment; and
an adjusting unit configured to adjust a flow rate of the cooling air in each of the air flow paths for temperature adjustment, based on a measurement value of the measuring unit.

9. The blow molding apparatus according to claim 8, further comprising
a control unit configured to receive a measurement value of the measuring unit, and configured to instruct the adjusting unit to adjust a flow rate of the cooling air based on the measurement value, the adjusting unit being on the air flow path for temperature adjustment and corresponding to the measuring unit.

10. A blow molding method comprising:
accommodating a preform in a first mold to perform a cooling blow that supplies cooling air to the preform in the first mold in order to adjust a temperature of the preform, the preform having been injection-molded, having a bottomed shape and made of a resin;
accommodating the preform in a second mold different from the first mold to blow-mold the preform that has been subjected to the temperature adjustment with blow air in the second mold, to manufacture a container made of a resin; and
recovering the blow air exhausted in the blow-molding into an air tank from which the cooling air is supplied.

* * * * *